Feb. 28, 1939.  E. O. LOVE ET AL  2,148,483
TOOTH, AND GUM MASSAGER AND EXERCISER
Filed May 20, 1936
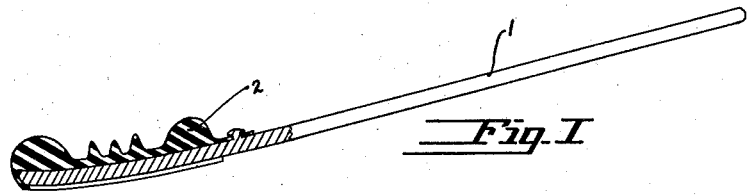
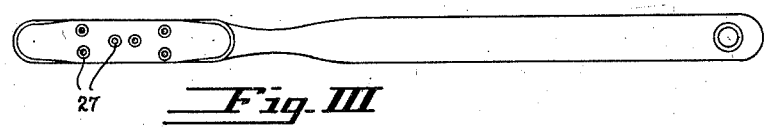
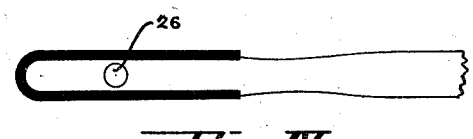
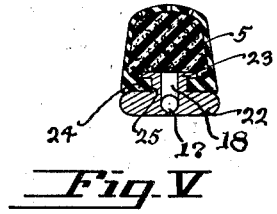
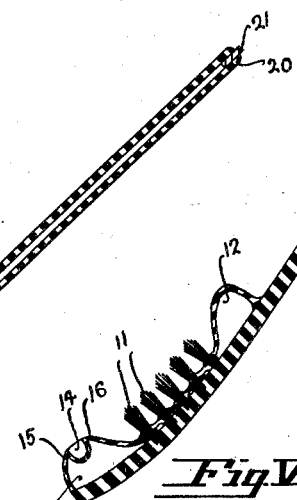
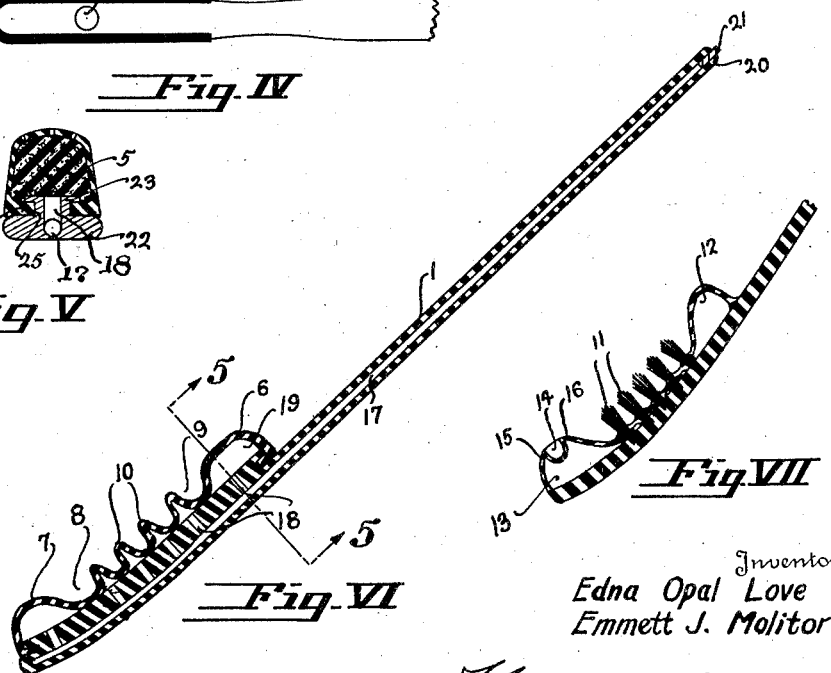
Inventors
Edna Opal Love
Emmett J. Molitor
By Thomas B. _____
Attorney Patented Feb. 28, 1939

2,148,483

UNITED STATES PATENT OFFICE 2,148,483

TOOTH AND GUM MASSAGER AND EXERCISER

Edna Opal Love and Emmett J. Molitor, Portland, Oreg., assignors to Lomo Gum Massager Co., Portland, Oreg., a corporation of Oregon Application May 20, 1936, Serial No. 80,754

2 Claims. (Cl. 128—62)

Our invention relates to tooth cleansing, gum massaging, dentifrice applicating devices. The invention is comprised primarily of a head and handle member. The head may have a pliable tooth gum massaging dentifrice applicator removably attached thereto. The removable member may be made of highly pliable material, as live rubber. It is cushioned by having a relatively large void disposed therein which may be filled with a dentifrice preferably in fluid form.

Where the head carries the dentifrice, provision is made for the admitting of the dentifrice into the void through the head of the handle member. The contour, shape and size of the removable or the pliable member is fashioned to clean the teeth, massage and exercise the gums as a single operation and the pliable head is also fashioned so that it may be used in massaging the gums upon the inside of both the lower and the upper jaws as well as upon the outside of the teeth.

The primary purpose and object of our invention is to provide in a single tool, a device that may be used for the cleaning of the teeth, for the massaging and exercising of the gums, It may also be used for the carrying of a dentifrice and the releasing of the dentifrice as the device is used.

A still further object of our invention consists in providing a device for the purpose intended that may be used instead of the dental gum massaging and gum exercising methods now so generally recommended by the dental and medical profession.

And a still further object of our invention consists in so constructing the device that it may be used for the treatment of pyorrhea and kindred ailments.

A still further object of our invention consists in so constructing the same and the mode of using the same that the device may be used in a highly sanitary and in an efficient manner.

With these and incidental objects in view, the invention consists in certain novel features of construction and combination of parts, the essential elements of which are set forth in the appended claims, and a preferred form of embodiment of which is hereinafter shown with reference to the drawing which accompanies and forms a part of this specification.

In the drawing:

Fig. 1 is a side view partially in section of one form of our device.

Fig. 2 is a fragmentary sectional side view of another form of our assembled device.

Fig. 3 is a top plan view of Figure 2.

Fig. 4 is a fragmentary inverted plan view of the device illustrating a plugged filler-opening for admitting a dentifrice into the device when a hollow form of head is used.

Fig. 5 is a sectional end view taken on the line 5—5 of Figure 6 and illustrating in addition thereto a quantity of soft rubber, a dentifrice or any other filler disposed within the hollow head.

Fig. 6 is a sectional side view of a modified form of our device.

Fig. 7 is a fragmentary sectional side view of a slightly modified form of device.

Like reference characters refer to like parts throughout the several views.

Our device is primarily comprised of a handle member 1. A head 2 is disposed upon one end of the handle. This head 2 may be formed integral with the handle, or it may be made independently thereof, or removably securable thereto. The head may also be made of a live rubber outer shell 3 or other highly resilient and pliable material, as shown in Figure 2. A void 4 is disposed within the head and may be filled with air or it may be filled with sponge rubber 5 or it may be filled with a dentifrice material. The outer contour of the head is preferably formed of enlarged nodules 6 and 7 that are disposed at the oppositely disposed ends of the head. These enlarged nodules 6 and 7 are preferably formed for the purpose of massaging, kneading and exercising the gums. The nodules 6 and 7 are spaced apart for a substantial distance. The outer nodule 7 is used for the massaging of the gums upon the outside of the upper and lower jaw and for massaging the gums upon the inside of the upper and lower jaw. A recess 8 is disposed between the outer nodule 7 and the teat disposed adjacent thereto and a recess 9 is disposed between the nodule 6 and a teat disposed adjacent thereto. A plurality of teats 10 are disposed between the nodules 6 and 7. The same are spaced apart and are preferably made smaller and of lesser height than that of the nodules 6 and 7.

The primary purpose and object of the teats 10 is for the cleansing of the teeth as well as for the massaging and otherwise caring for the gums.

We may make the head of the device as illustrated in Fig. 7 and when so made we may place a plurality of bristle brushes 11 between the nodules 12 and 13 to provide a device for the cleaning of the teeth and for the massaging of the gums. We may also place a recess 14 within the outer nodule to provide relatively sharp edges 15 and 16 transversely of the outer nodule 14 to aid in the treatment of the gums.

For the maintaining of a desired pressure within the space or compartment disposed between the head of the handle and the rubber sheath that is to comprise the massaging head and that is fashioned to meet the requirements and purpose intended we may make the handle 1 having an opening 17 running longitudinally thereof and provide holes 18 through the head that communicate with the space 19 disposed between the sheath and the head of the handle. (See Figure 6.) Air pressure may be developed therethrough through lung pressure by blowing into the opening 17 and the pressure may be retained therein by holding one of the digits over the outer end 20, or a plug 21 may be inserted therein.

It may be found desirable to make the outer sheath a removable member as illustrated in Figures 5 and 6 and when so made the outer sheath 2 may be made as illustrated in sectional detail in Fig. 5. When so made the head of the handle is comprised of a base 22 and a T-shaped head 23 that has a recess disposed about the T-shaped head 23. The sheath has a bead 24 running therearound and the bead 24 is made to engage within a groove 25 disposed between the base 22 and the outer end 23 of the T-shaped head.

Where the sheath is made of live rubber and is made to precisely fit, the same may be secured to the head and be held in place by the tension developed within the rubber when the same is placed thereupon.

The teats in any of the forms using hollow heads may have orifices disposed therein that communicate the interior of the sheath with the exterior of the head and by placing a dentifrice within the space disposed therebetween and as pressure is applied to the treating head the dentifrice may be exuded through the teats and be applied to the surface being treated. When so made, that portion of the handle to which the head is attached may be formed with a filler opening which is provided with a removable plug 26 to facilitate the filling of the head with the dentifrice. Orifices 27 disposed within the teats are illustrated in Fig. 3.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What we claim is:

1. In a device of the class described, the combination of a handle, and a soft pliable head disposed adjacent one of the ends of the handle, said head having a plurality of nodules outwardly extending from the same side of the head and a plurality of teats disposed between the nodules and disposed upon the same side of the head, and a void disposed within the head and behind the nodules and teats.

2. In a device of the class described, the combination of a handle, a compressible head disposed at one end of the handle, said compressible head having nodules disposed at its ends and having teats disposed therebetween and said nodules being curved transversely of the compressible head, and a void disposed within the head and at the base of the nodules and teats.

EDNA OPAL LOVE.
EMMETT J. MOLITOR.